United States Patent [19]

Geffray

[11] Patent Number: 5,431,085
[45] Date of Patent: Jul. 11, 1995

[54] THRUST REVERSER ACTUATOR

[75] Inventor: Bruno J. C. Geffray, Brunoy, France

[73] Assignee: S.N.E.C.M.A. - Societe Nationale D'Etude et de Construction de Moteurs D'Aviation, Paris, France

[21] Appl. No.: 260,782

[22] Filed: Jun. 16, 1994

[30] Foreign Application Priority Data

Jun. 16, 1993 [FR] France .................. 93 07236

[51] Int. Cl.6 ............................................. F15B 15/26
[52] U.S. Cl. .................................. 91/44; 91/45
[58] Field of Search ........................ 91/41, 44, 45

[56] References Cited

U.S. PATENT DOCUMENTS

| | | |
|---|---|---|
| 3,024,771 | 3/1962 | Criffield . |
| 4,585,172 | 4/1986 | Gazzera ........................ 91/44 |
| 4,858,430 | 8/1989 | Belbouche . |
| 4,894,985 | 1/1990 | Dubois et al. . |
| 4,914,905 | 4/1990 | Dubois et al. . |
| 4,916,895 | 4/1990 | Dubois . |
| 4,960,243 | 10/1990 | Dubois et al. . |
| 4,976,466 | 12/1990 | Vauchel . |
| 5,039,171 | 8/1991 | Lore . |
| 5,097,748 | 3/1992 | Koch et al. ................... 91/45 |

FOREIGN PATENT DOCUMENTS 524875  1/1993  European Pat. Off. .
2618853  2/1989  France .

Primary Examiner—F. Daniel Lopez
Attorney, Agent, or Firm—Bacon & Thomas

[57] ABSTRACT

An actuator for a thrust reverser is disclosed which will prevent retraction of the thrust reverser door from its open, reverse thrust position should there be a malfunction in the locking system which locks the thrust reverser door in its closed forward thrust position. Upon deployment of the thrust reverser during a normal aircraft landing, should there be a malfunction in the thrust reverser door locking system, the actuator holds the thrust reverser doors in their opened positions so as to provide a positive, visual indication of such a system malfunction. The actuator has an internal device in the actuator head which, in cooperation with the control rod of the secondary mechanical locking system prevents hydraulic fluid from retracting the actuating piston and rod assembly from their extended positions and thereby prevents retraction of the thrust reverser door from the reverse thrust positions. Since thrust reverser doors are always fitted with position sensors, the failure of the thrust reverser door to return to its forward thrust position will be sensed by the normal aircraft position sensors so as to provide a positive indication to the aircraft crew of a defect in the mechanical locking system.

3 Claims, 4 Drawing Sheets

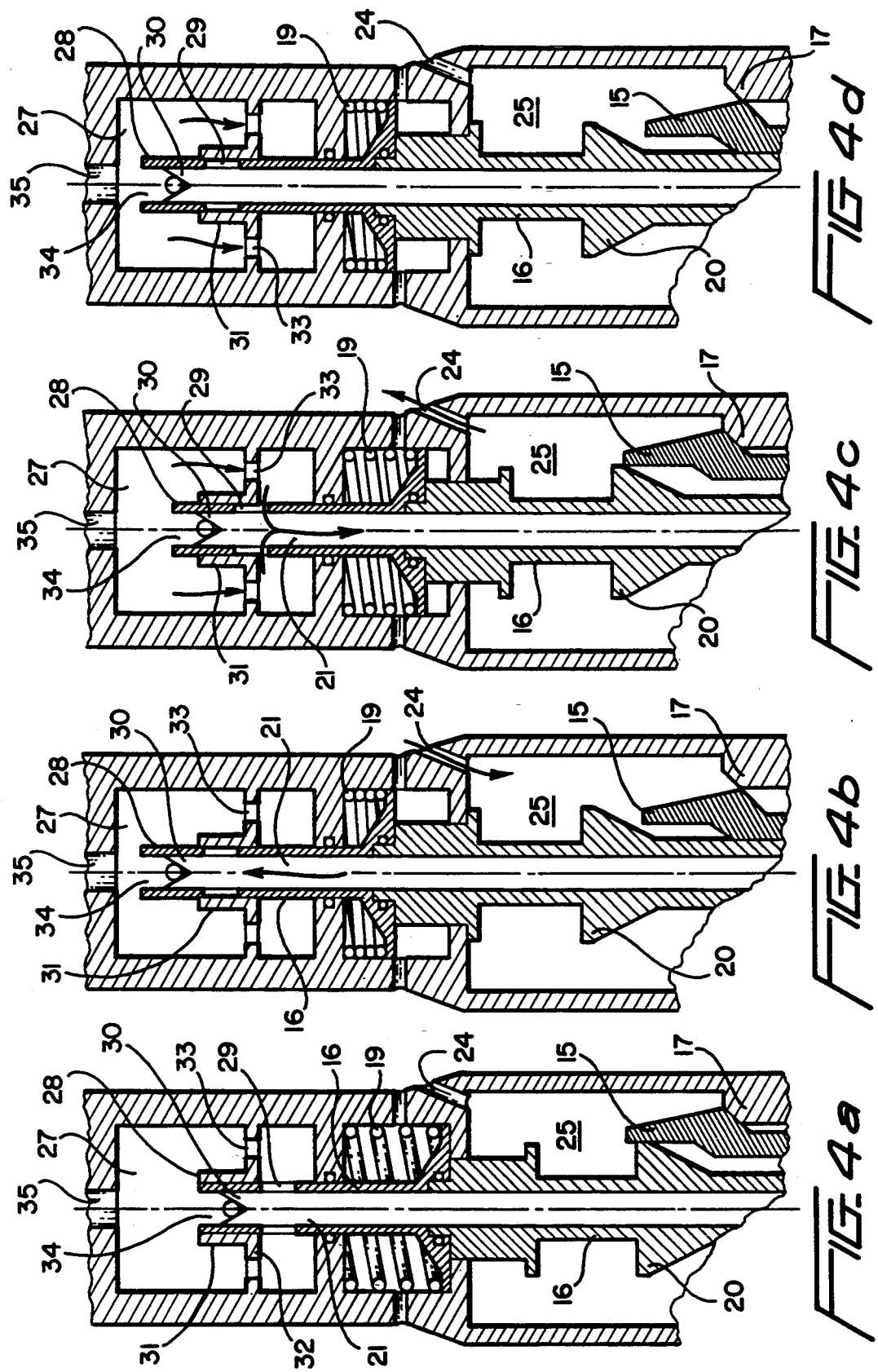

THRUST REVERSER ACTUATOR

BACKGROUND OF THE INVENTION

The present invention relates to an actuator for a thrust reverser for an aircraft turbojet engine, more particularly such an actuator which will prevent retraction of a thrust reverser door from its opened, thrust reversing position in case of a malfunction in the safety locking mechanism which locks the thrust reverser in its closed, forward thrust position.

Thrust reversers for aircraft turbojet engines are, of course, well known in the art and serve to increase aircraft safety by providing a braking force to the aircraft when landing on wet or icy runways. Such thrust reversers may take the form of one or more thrust reversing doors pivotably attached to the engine nacelle which doors are movable between closed, forward thrust positions and open, reverse thrust positions. When in their opened positions, the doors redirect the gases from the turbojet engine to provide a reverse thrust to the aircraft.

In turbofan-type engines, wherein the turbojet engine drives a turbofan assembly, a significant portion of the thrust is achieved via the turbofan flow. Typically, such installations have an outer nacelle which encloses the turbofan and the turbojet engine so as to define a cold flow air duct between the exterior of the turbojet engine housing and the interior of the turbofan in the nacelle. In such engines having a high bypass ratio, it is known to apply the thrust reversers to only the cold flow duct to redirect a portion of the airflow passing through this duct.

A typical prior art installation is illustrated in FIGS. 1 and 2 wherein it can be seen that the structure comprises a forward, or upstream portion of the nacelle 1, one or more pivotable thrust reversing doors 2 and a stationary, downstream cowl 3. The forward or upstream portion 1 of the nacelle comprises an external nacelle panel 4 and an internal nacelle panel 5 which defines the exterior boundary of the gas flow duct, which panels are interconnected by support frame 6. Support frame 6 also supports the thrust reverser door actuator 7a which may comprise a hydraulic cylinder having an extendible and retractable piston rod so as to move the thrust reverser door 7 between its closed, forward thrust position (illustrated in FIG. 1) and its opened, reverse thrust position (as illustrated in FIG. 2). The number of thrust reverser doors 7 will depend upon the specific aircraft on which the nacelle is mounted and the location of the engine with respect to the remaining aircraft structure. FIG. 2 partially illustrates a turbojet engine nacelle having four thrust reverser doors 7, two of which are illustrated in the open, reverse thrust positions. An actuator 7a may be operatively associated with each of the thrust reverser doors 7.

Typical examples of such known prior art thrust reversing systems may be found in U.S. Pat. Nos. 4,858,430; 4,916,895; 4,914,905; 4,976,466; 4,960,243; and 5,039,171.

As can be imagined, serious consequences may result from an untimely displacement of the thrust reverser to its opened, thrust reversing position should such occur at any time other than during landing when the aircraft is on the runway. Present day thrust reversers are equipped with many redundant systems to prevent such an occurrence. Typically, the thrust reverser doors are each fitted with a mechanical primary lock on the support structure and a mechanical secondary lock in the door actuator to prevent opening of the thrust reverser door in the event the primary mechanical lock should fail.

However, the secondary mechanical lock is typically internally located within the actuator and, should a malfunction in the secondary locking system occur, the thrust reverser door may operate in its normal fashion and hide the malfunctioning of the secondary mechanical lock. Thus, even the redundant safety locking systems have fallen short of avoiding all possible risks to safeguard against the simultaneous failure of the primary and secondary mechanical locks.

Some systems additionally have a further safety device to preclude any possible opening of the thrust reverser door by blocking any hydraulic fluid flow from the actuator when the thrust reverser door is in the closed, forward thrust position. Such a system is illustrated in European patent 0 524 875. However, this method entails a rather complex hydraulic system requiring additional means to protect portions of the thrust reverser hydraulic control system against over pressurization when in the locked mode. Furthermore, this safety device as in the internal mechanical system, itself may be subject to undetected malfunctions.

SUMMARY OF THE INVENTION

An actuator for a thrust reverser is disclosed which will prevent retraction of the thrust reverser door from its open, reverse thrust position should there be a malfunction in the locking system which locks the thrust reverser door in its closed forward thrust position. Upon deployment of the thrust reverser during a normal aircraft landing, should there be a malfunction in the thrust reverser door locking system, the actuator holds the thrust reverser doors in their opened positions so as to provide a positive, visual indication of such a system malfunction.

The actuator has an internal device in the actuator head which, in cooperation with the control rod of the secondary mechanical locking system prevents hydraulic fluid from retracting the actuating piston and rod assembly from their extended positions and thereby prevents retraction of the thrust reverser door from the reverse thrust positions. Since thrust reverser doors are always fitted with position sensors, the failure of the thrust reverser door to return to its forward thrust position will be sensed by the normal aircraft position sensors so as to provide a positive indication to the aircraft crew of a defect in the mechanical locking system.

The actuator according to the present invention cooperates with the control rod for the internal secondary lock in the thrust reverser actuator so as to prevent hydraulic fluid from passing through the control rod into a portion of the cylinder which prevents retraction of the piston rod from its extended position. This is accomplished by an extension of the control rod located in a chamber, which may be defined by the actuating cylinder, such that the extension passes through a sleeve located in the chamber. The extension defines an aperture which communicates with the chamber and with the passageway passing through the center of the control rod which enables pressurized hydraulic fluid to pass to the retraction side of the actuator piston.

When the control rod is raised to unlock the secondary mechanical lock, the aperture is blocked by the sleeve. This blockage, in conjunction with the check valve located in the extension, passageway prevents any high pressure hydraulic fluid from entering the passageway and retracting the piston. Under normal conditions, when the control rod is not malfunctioning, it is urged into its locking position by a spring bias. Such a spring biasing force will move the control rod such that the extension aperture is withdrawn from the sleeve and may communicate with the hydraulic fluid so as to retract piston rod as well as the thrust reverser door. However, should the control rod malfunction and not return to its locking position, hydraulic fluid will be prevented from acting on the actuator piston and retracting the thrust reverser door.

BRIEF DESCRIPTION OF THE DRAWINGS

FIG. 4a is a partial, cross-sectional view of the thrust reverser actuator according to the present invention with the control rod in its locked position.

FIG. 4b is a view similar to FIG. 4a indicating the control rod in its unlocked position.

FIG. 4c is a view similar to FIGS. 4a and 4b illustrating the return of the control rod to its locked position under normal non-malfunctioning conditions.

FIG. 4d is a view similar to FIGS. 4a–4c, illustrating the component positions should the control rod malfunction and not return to its locked position.

DETAILED DESCRIPTION OF THE PREFERRED EMBODIMENT

Figure 1:
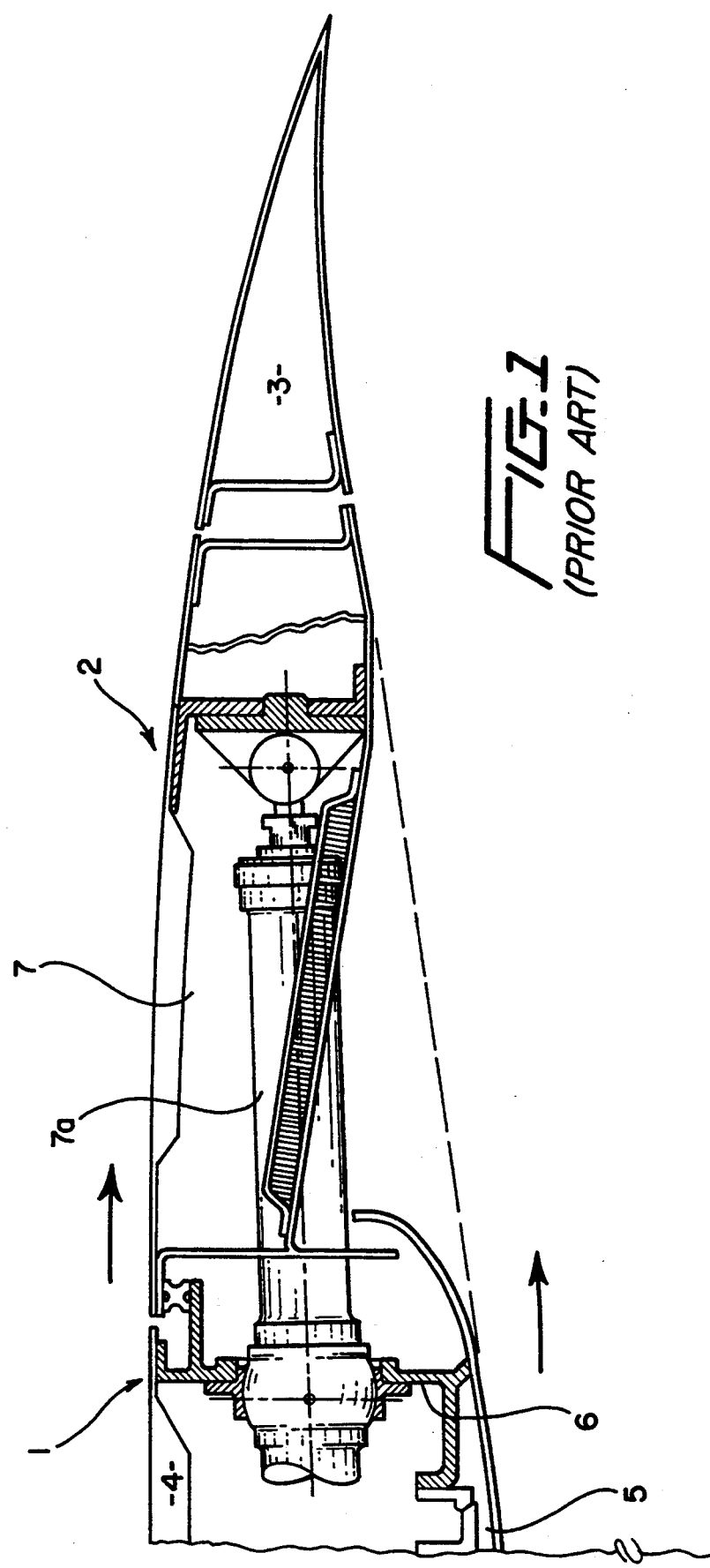
FIG. 1 is a partial, longitudinal cross-sectional view of an engine nacelle indicating a known thrust reverser door structure.
Figure 2:
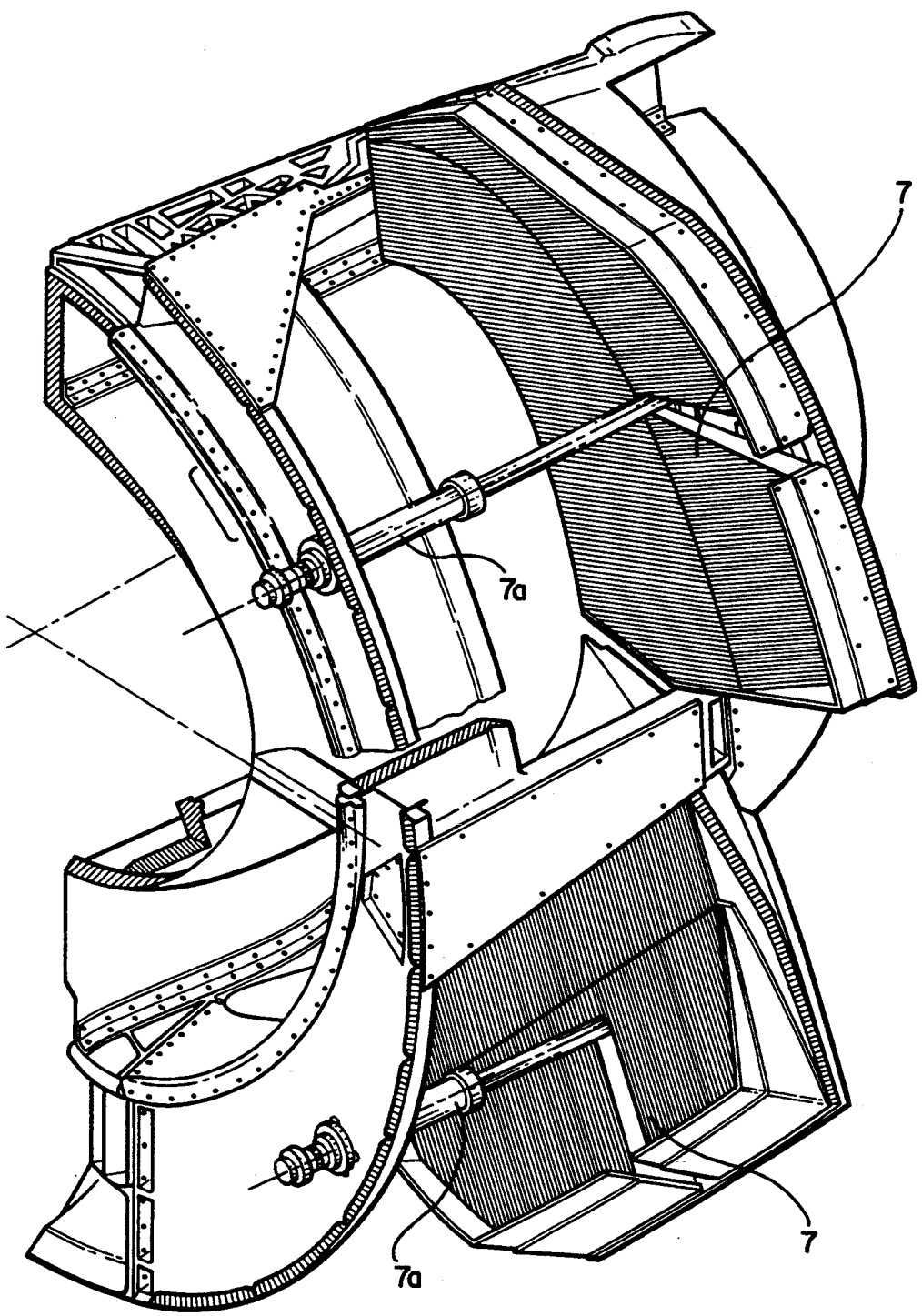
FIG. 2 is a partial, perspective view of a known thrust reverser illustrating the thrust reverser doors in their opened, reverse thrust positions.
Figure 3:
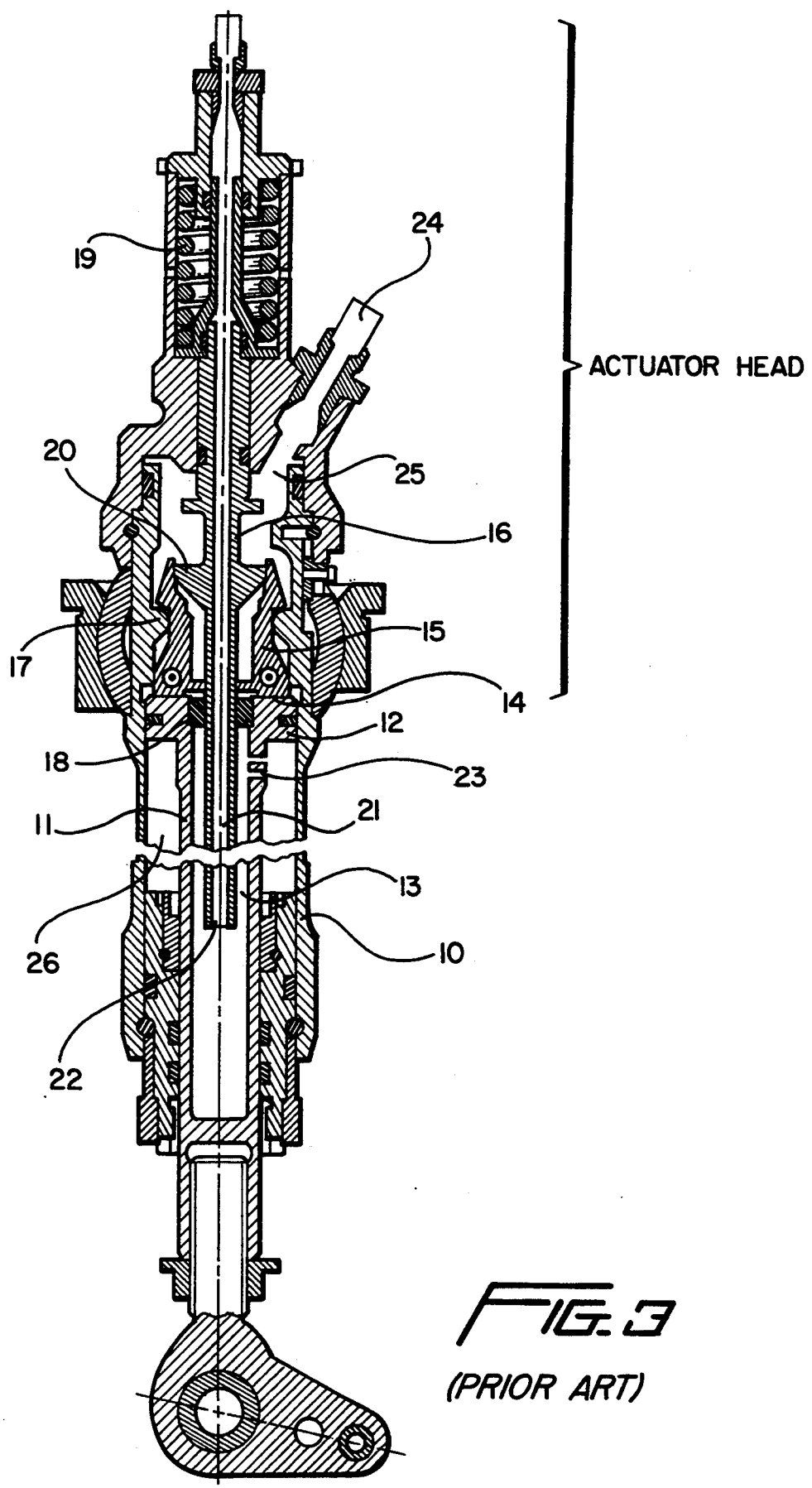
FIG. 3 is a cross-sectional view of a known hydraulic actuator used in the prior art thrust reversing systems.

FIG. 3 is a cross-sectional view of a known, prior art hydraulic actuator developed by Abex National Waterlift (USA) which comprises a cylindrical casing 10 which houses a piston assembly 11 which separates the cylinder into two internal chambers 25 and 26. The piston can axially slide within the cylindrical casing 10 and comprises a piston head 12 and a rod 13. A locking device comprising locking anchors 15, which is controlled by control rod 16, is attached to the side 14 of the piston head 12.

The inside wall of the cylindrical casing 10 defines retaining studs 17 which are engaged by the locking anchors 15 when the piston 11 is retracted, as illustrated in FIG. 3. Control rod 16 is mounted in the actuator head and extends along the axis of the cylindrical casing 10 through the piston head 12 via a clearance 18. The end of control rod 16 defining exhaust orifice 22 is located within the piston rod 13. Control rod 16 is biased into its locked position, illustrated in FIG. 3, by a spring 19. Control rod 16 also comprises a generally conical actuating portion 20 which bears against the locking anchors 15 when the control rod is in its locked position to keep the anchors 15 engaged with retaining studs 17.

A longitudinal passageway 21 extends through the control rod 16 and communicates with orifice 22 at one end and with the hydraulic control system at an opposite end. The piston rod 13 defines bores 23 which enable communication between the interior of the piston rod 13 and the chamber 26. Hydraulic fluid is selectively applied to the internal passageway 21 and conduit 24 which communicates with internal chamber 25 on the opposite side of the piston head 12. When the longitudinal passageway 21 is connected to a high pressure hydraulic fluid and the conduit 24 is connected to an exhaust portion of the hydraulic system (as illustrated in FIG. 3), the high pressure fluid passes through the passageway 21 into the interior of piston rod 13, through the bores 23 and into the chamber 25 to act on one side of the piston head 12 (the underside as viewed in FIG. 3). Such high pressure acting on the piston head 12 causes the piston assembly 11 to retract into the cylindrical casing 10 so as to move the thrust reverser doors to their closed, forward thrust positions. As can be seen in FIG. 3, under these conditions, the secondary mechanical lock anchors 15 will engage the retaining stud 17 and prevent any movement of the piston assembly 11 toward its extended position which would move the thrust reverser doors away from their closed, forward thrust positions.

In order to open the thrust reverser doors, high pressure hydraulic fluid is piped into actuator chamber 25 via conduit 24 while the internal longitudinal passageway 21 is connected to the hydraulic fluid exhaust side. The pressurized hydraulic fluid in chamber 25 acts on the control rod 16 so as to move it in an unlocked position (upwardly, as viewed in FIG. 3) thereby disengaging the conical actuating portion 20 from the locking anchors 15 and enabling them to pivot towards the central axis of the cylinder and disengage from the retaining studs 17. The high pressure actuating fluid also acts on the upper side of piston head 12 (as viewed in FIG. 3) to urge the piston 11 toward its extended position. When the high pressure hydraulic fluid no longer acts within chamber 25, biasing spring 19 urges the control rod 16 back to its locked position such that, upon retraction of the piston 11, it will again urge the locking anchors 15 into contact with the retaining studs 17.

However, should the control rod malfunction and remain in its unlocked position, the actuator would still function in its normal operation to deploy and retract the thrust reverser doors and would give no indication of any malfunction of the locking mechanism.

To prevent such a situation, the present invention provides, as illustrated in FIGS. 4a–4d, an improved actuator head. The secondary lock control rod extends upwardly beyond the spring 19 within the actuator head into a chamber 27 which may be defined by the actuator casing. The rod extension 28 defines an extension of passageway 21 which communicates through the control rod and one or more apertures 29 which extend laterally through the extension rod 28 and which communicate with the passageway 21. A check valve 30 is located in the end 34 of the extension rod and is oriented such that the check valve will prohibit flow of fluid into the passageway 21 through the end 34, but will enable fluid to flow from the passageway 21 outwardly through the end 34 of the extension 28. A sleeve 31 is located within the chamber 27 by base 32 which defines a plurality of holes 33.

FIG. 4a illustrates the position of the control rod 16 in its locked position wherein the apertures 29 are in fluid communication with the chamber 27 and are displaced out of the sleeve 31.

FIG. 4b illustrates normal deployment of the thrust reverser door to its opened, reverse thrust position wherein the high pressure fluid in chamber 25 urges the control rod upwardly to its unlocked position to enable the locking anchors 15 to slide over the retaining studs 17. In its unlocked position, the extension 28 is positioned such that the apertures 29 are blocked by the sleeve 31 to prevent any hydraulic fluid from flowing either into or out of the passageway 21 via the apertures 29. Fluid flows through passageway 21 and exits through the end 34 since the check valve 30 allows fluid flow in this direction.

FIG. 4c illustrates the return of the control rod 16 to its locked position under normal circumstances in which there is no malfunction of the locking mechanism. Once the pressurized fluid is released from chamber 25, biasing spring 19 urges the control 16 back towards its locked position, thereby displacing the apertures 29 from the sleeve 31 and enabling pressurized hydraulic fluid to pass into passageway 21 and, as previously explained, to retract the piston 11 into the cylinder.

However, should the control rod 16 malfunction and not return to its locked position, as illustrated in FIG. 4d, upon removal of the high pressure fluid acting in chamber 25, the pressurized hydraulic fluid in chamber 27, which would normally urge the thrust reverser doors to their closed, forward thrust positions, is incapable of entering the passageway 21 and retracting the piston 11 into the cylinder casing 10. As can be seen, check valve 30 prevents any pressurized fluid from entering the end 34 of the extension 28 and the apertures 29 are blocked by sleeve 31. Thus, since pressurized hydraulic fluid cannot act on the piston 11, the malfunction of the control rod 16 will be clearly indicated by the positions of the thrust reverser doors remaining open and by any thrust reverser door positioning alarms in the aircraft cockpit, clearly indicating a malfunction of the door locking system.

The foregoing description is provided for illustrative purposes only and should not be construed as in any way limiting this invention, the scope of which is defined solely by the appended claims.

I claim:

1. An actuator for a turbojet engine thrust reverser having a piston and rod located in and movable with respect to a cylinder between extended and retracted positions, locking means connected to the piston and cylinder so as to lock the piston and rod in their retracted position and a control rod movably located in the cylinder so as to move between a locked position wherein it prevents unlocking of the locking means and an unlocked position wherein it permits unlocking of the locking means, the actuator comprising:
   a) means defining a chamber communicating with a fluid control system;
   b) an extension attached to the control rod and extending into the chamber, the extension defining an extension passageway in fluid communication with a passageway extending through the control rod;
   c) a check valve located in the extension passageway so as to allow fluid to flow out of the control rod passageway to the chamber and prevent fluid from flowing into the control rod passageway from the chamber;
   d) a sleeve located in the chamber through which the extension passes;
   e) biasing means acting on the control rod to bias the control rod toward its locked position and,
   f) at least one aperture defined by the extension communicating with the extension passageway, the at least one aperture located such that it is covered by the sleeve when the control rod is in its unlocked position so as to prevent fluid in the chamber from entering the extension passageway through the at least one aperture whereby retraction of the piston and rod is prevented.

2. The actuator of claim 1 wherein the chamber is defined by the actuator cylinder.

3. The actuator of claim 1 wherein the biasing means comprises a spring.

* * * * *